Dec. 22, 1936.  W. H. REYNOLDS  2,064,946
THERMOSTATIC REGULATOR
Filed Feb. 12, 1935
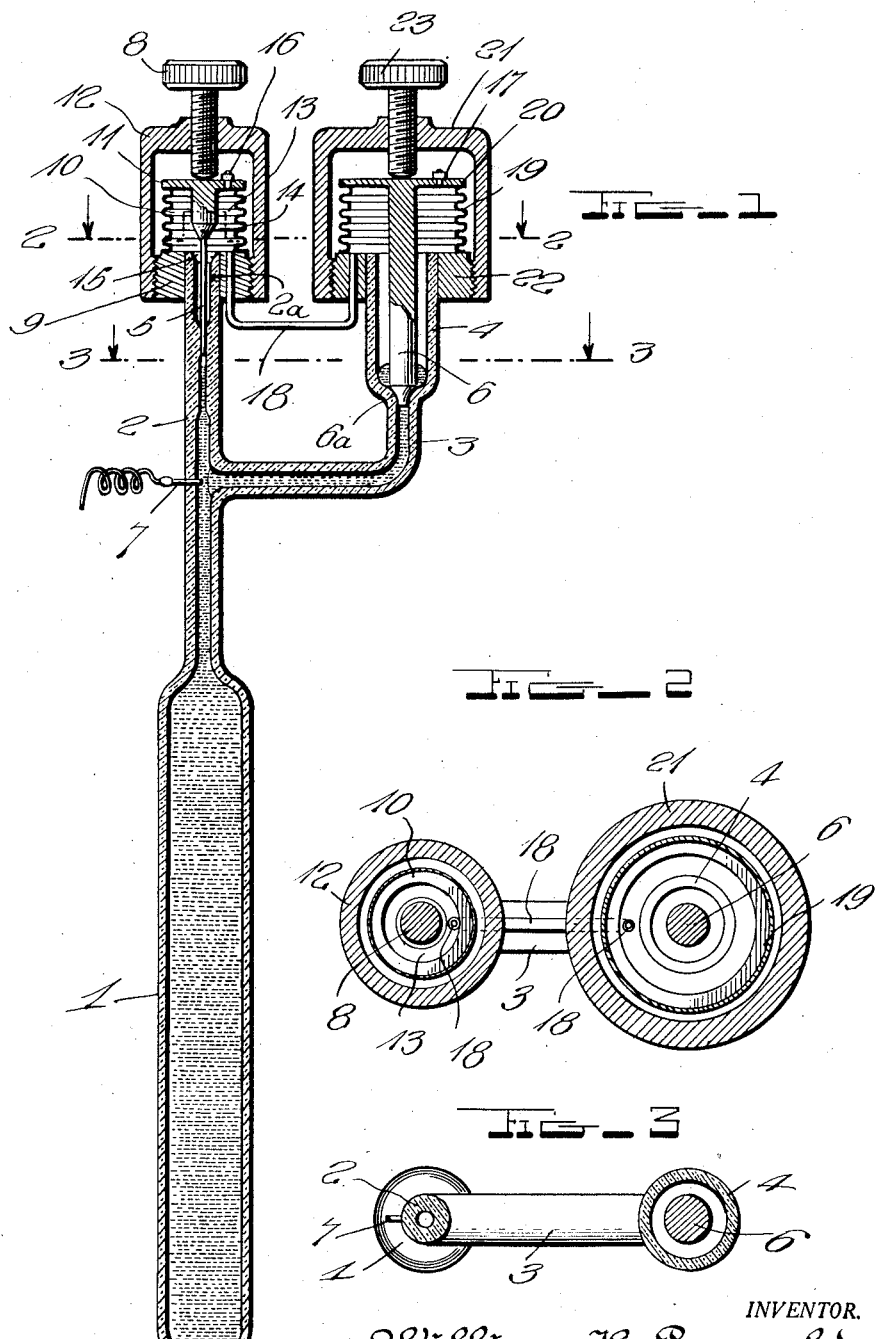
INVENTOR.
William H. Reynolds,
BY John B. Brady.
ATTORNEY Patented Dec. 22, 1936

2,064,946

UNITED STATES PATENT OFFICE 2,064,946

THERMOSTATIC REGULATOR

William H. Reynolds, Silver Spring, Md., assignor to American Instrument Company, Washington, D. C., a corporation of Delaware Application February 12, 1935, Serial No. 6,202

16 Claims. (Cl. 200—141)

My invention relates broadly to thermostats and more particularly to a readily adjustable thermostat having a high degree of precision.

One of the objects of my invention is to provide a sealed thermostatic regulator which may be readily set while in operating position.

Another object of my invention is to provide a construction of readily settable thermostat in which the adjustment of the thermostat may be quickly effected with a high degree of precision.

Still another object of my invention is to provide a construction of readily settable thermostat in which the electrical contact is protected against oxidation by maintaining the electrical contact in an inert gas.

A further object of my invention is to provide a construction of an enclosed settable thermostat employing an auxiliary reservoir with mechanical means for controlling the path of expansion of the mercury in the capillary and the auxiliary reservoir.

A still further object of my invention is to provide a construction of readily settable thermostatic regulator having a bellows device for supporting a contact member adjustable in the end of the capillary with means for accurately adjusting the position of the bellows for correspondingly controlling the position of the contact at the capillary while maintaining the contact in a non-oxidizing gas.

A further object of my invention is to provide a construction of settable thermostat which includes a capillary and an auxiliary reservoir having a sealed bellows device sealing both the capillary and the auxiliary reservoir with means for controlling the position of each bellows device for correspondingly controlling the position of an electrical contact in the capillary and the position of a valve in the auxiliary reservoir.

Other and further objects of my invention reside in the construction of mercury and glass adjustable thermostat set forth more fully in the specification hereinafter following by reference to the accompanying drawing, in which:

Figure 1 is a vertical sectional view taken through the adjustable thermostat of my invention; Fig. 2 is a lateral sectional view taken on line 2—2 of Fig. 1; and Fig. 3 is a lateral sectional view taken on line 3—3 of Fig. 1.

My invention is directed to that class of adjustable thermostat represented by Letters Patent No. 1,945,434, granted January 30, 1934, on the application of David McKay Greer, and Letters Patent No. 1,992,066, granted Feb. 19, 1935, on the application of David McKay Greer. However, in the thermostat set forth in the Greer patent and application, and in thermostats of the prior art, there have been many disadvantages of which I may mention the necessity of manually shaking the thermostat in order to spill mercury into and out of the bulb which is somewhat difficult to do. The accuracy of control by the manual method depends upon the size of the smallest drop of mercury that it is possible to transfer between the auxiliary reservoir and the capillary.

In the thermostat of my invention, I employ special means to prevent oxidation of the adjustable electrical contact while at the same time permitting precision adjustment in the position of the contact without shaking the thermostat. Inasmuch as mechanical movement of the thermostat is unnecessary, my construction allows setting of the thermostat while the thermostat is in operating position. Moreover, the adjustment which I provide is effected wholly in a non-oxidizing atmosphere so that the efficient life of the thermostat is indefinitely prolonged. The thermostat of my invention embodies the advantages of both the open and closed thermostat, in that it makes for ease of adjustment and provides a totally sealed chamber which may be filled with hydrogen or other non-oxidizing gas.

Referring to the drawing in detail, reference character 1 designates the bulb made of glass or other material which is filled with mercury. The capillary 2 is attached to the bulb at its top. A side arm 3 is provided interconnecting one side of the capillary 2 with the auxiliary reservoir 4. The upper extremity of the capillary 2 is concentrically recessed, as indicated at 2a to allow free and easy adjustment of the electrical contact shown at 5 and to provide a seat for valve 14. The upper end of the capillary 2 is also made larger in diameter so that, if overheated to a reasonable degree, the mercury will tend to fill this chamber and not overflow into the bellows 10. In the auxiliary reservoir 4, I provide a valve 6 which is vertically adjustable with respect to a valve seat 6a formed between the lower end of the reservoir 4 and the side arm or laterally extending connecting passage 3. If the bulb 1 is immersed in a gas or fluid and the temperature of the latter rises, the mercury in the bulb 1 expands and rises in both the capillary 2 and the reservoir 4. If the valve 6 is closed during this heating, all the rise takes place in capillary 2.

When the mercury in capillary 2 has risen to sufficient height, it touches contact wire 5 and completes the circuit from contact 7 to upper contact screw 8. These contacts may be placed in the circuit with a source of electromotive force and a relay to cause the latter to operate and make and break the heating current. In any reasonable use of the regulator, mercury will always be in contact with valve 6 so that any metal part of the side arm reservoir such as 23, 21 or 22, can be used as one side of the electrical circuit, thus obviating the necessity of sealing contact 7 into the capillary 2.

The metal collar 9 is sealed to the glass capillary 2 by any one of several commonly known methods, such as platinizing the glass and soldering the collar to the platinum coating. To this collar 9 is fastened a metal bellows 10; to the top of metal bellows 10 is sealed by soldering, welding, or otherwise securing a plate 11. Contact screw 8 being threaded to frame 12 causes plate 11 to move up and down, as contact screw 8 is turned. The plate 11 in moving up and down carries with it contact 5, thus causing the mercury in capillary 2 to come into contact with contact 5, earlier or later in its travel. At the same time, it may be seen that chamber 13 is entirely sealed from the atmosphere. The natural elasticity in bellows 10 returns it to its normal upward position when screw 8 is backed out of frame 12.

It will be noted that the range of movement of bellows 10 is limited by its elastic limit, and, therefore, the movement of contact 5 is limited to a relatively small amount.

In order that the temperature range of the thermostat may be greater than the limiting factor just mentioned, I keep the valve 6 open until the temperature rises almost to the point of contact 5. Due to the ratio of cross-section of reservoir 4 and capillary 2, most of the mercury that expands up from the bulb finds its way into reservoir 4 as long as valve 6 is open, and the rise in capillary 2 is no more rapid than that in reservoir 4, because they are under approximately the same hydrostatic pressure, thus permitting only a very small movement of the mercury in capillary 2. In order to insure the maintenance of the same pressure in both the upper portion of capillary 2 and the reservoir 4, I provide a bleeder passage 18 interconnecting the spaces beneath bellows 10 and bellows 19.

It will be noted that the construction of the side arm 3, and parts associated therewith, that is, chamber, bellows, frame, adjusting screw, collar, and capillary, are substantially as described by reference characters 12, 11, 10, 9, and 8, and that the reservoir 4 is also entirely sealed from the atmosphere. That is to say, bellows 19 corresponds in construction to the bellows 10, although bellows 19 is larger in diameter than bellows 10. The top of bellows 19 is sealed by means of plate 20. The frame 21 engages the metal collar 22 which connects to the auxiliary reservoir 4 and serves as a supporting means for the adjusting screw 23. Both screws 8 and 23 are independently adjustable and the movement thereof is always within the range of elasticity of the bellows 10 and 19, respectively. Contact screw 8 when moved downwardly presses plate 11 tending to collapse bellows 10 within a small limit in order to downwardly adjust the contact 5. When backing off on contact screw 8, bellows 10 restores contact 5 to a vertically upward position depending upon the resiliency of bellows 10. Correspondingly, screw 23 bears against plate 20 to collapse bellows 19 within its range of yieldability to close valve 6 against valve seat 6a. When screw 23 is rotated to relieve the pressure against plate 20, the bellows 19 raises valve 6 to a position out of engagement with valve seat 6a.

To prevent the mercury in the bulb and capillary from rising into chamber 13 during shipment, I turn screw 8 down until valve 14 closes on seat 15. If there is danger of bulb 1 breaking due to a rise in temperature and thus a rise in internal pressure during shipment, it can be obviated by warming the bulb to about 100° F., and then closing both valves while warm. As the bulb cools, it is under a reduced pressure which eliminates the possibility of breakage. The chambers are sealed at sealing tips 16 and 17 respectively in plates 11 and 20.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States, is as follows:

1. A mercury and glass adjustable thermostat comprising a bulb, a capillary connected with the bulb, an auxiliary reservoir connected with said capillary, a bellows device connected with the upper extremity of said capillary, a separate bellows device connected with the upper extremity of said auxiliary reservoir, an electrical contact carried by the bellows device which connects with said capillary, a valve carried by the bellows device which connects with said auxiliary reservoir, and independent means for adjusting the position of each of said bellows devices.

2. An adjustable mercury and glass thermostat comprising a bulb, a capillary connected with the bulb forming a path for a mercury column therein, an auxiliary reservoir connected with said capillary, a bellows device enclosing a non-oxidizing atmosphere and connected with the upper extremity of said capillary, a separate bellows device connected with the upper extremity of said reservoir, an electrical contact carried by the first mentioned bellows device and operative in said capillary, a valve carried by the second mentioned bellows device for opening or closing the passage between said capillary and said auxiliary reservoir, and means for adjusting the position of each of said bellows devices.

3. An adjustable mercury and glass thermostatic regulator, including a bulb, a capillary connected with said bulb and forming a path for mercury therein, an auxiliary reservoir, a connection between said auxiliary reservoir and said capillary, a valve for opening and closing the passage between the said last named connection and the said auxiliary reservoir, an electrical contact in said capillary, a bellows device carrying said valve, a separate bellows device for carrying said electrical contact, and independent means for adjusting each of said bellows devices.

4. An adjustable mercury and glass thermostatic regulator, including a bulb, a capillary connected with said bulb and forming a path for mercury therein, an auxiliary reservoir, a connection between said auxiliary reservoir and said capillary, a valve for opening and closing the passage between the said last named connection and the said auxiliary reservoir, an electrical contact in said capillary, a bellows device carrying said valve, a separate bellows device for carrying said electrical contact, said bellows devices each enclosing a non-oxidizing atmosphere within which said valve and said electrical contact are operative.

5. An adjustable mercury and glass thermostatic regulator, including a bulb, a capillary connected with said bulb and forming a path for mercury therein, an auxiliary reservoir, a connection between said auxiliary reservoir and said capillary, a valve for opening and closing the passage between the said last named connection and the said auxiliary reservoir, an electrical contact in said capillary, separate bellows devices for carrying said valve and said electrical contact, and means for equalizing the pressure interiorly of each of said bellows devices.

6. An adjustable mercury and glass thermostatic regulator, including a bulb, a capillary connected with said bulb and forming a path for mercury therein, an auxiliary reservoir, a connection between said auxiliary reservoir and said capillary, a valve for opening and closing the passage between the said last named connection and the said auxiliary reservoir, an electrical contact in said capillary, separate bellows devices for carrying said valve and said electrical contact, independent means for adjusting each of said bellows devices, and said bellows devices each enclosing a non-oxidizing atmosphere within which said valve and said electrical contact are operative.

7. An adjustable mercury and glass thermostatic regulator, including a bulb, a capillary connected with said bulb and forming a path for mercury therein, an auxiliary reservoir, a connection between said auxiliary reservoir and said capillary, a valve for opening and closing the passage between the said last named connection and the said auxiliary reservoir, an electrical contact in said capillary, separate bellows devices for carrying said valve and said electrical contact, independent means for adjusting each of said bellows devices, and means for equalizing the pressure interiorly of each of said bellows devices.

8. An adjustable mercury and glass thermostatic regulator, including a bulb, a capillary connected with said bulb and forming a path for mercury therein, an auxiliary reservoir, a connection between said auxiliary reservoir and said capillary, a plate member secured to the extremity of said capillary and to the extremity of said auxiliary reservoir, an expansible bellows device individual to each of said plate members, and forming a confining area for a non-oxidizing atmosphere, an electrical contact supported by the bellows at the extremity of said capillary, a valve supported by the bellows device adjacent the extremity of said auxiliary reservoir, and means for individually adjusting the position of each of said bellows for controlling the position of said electrical contact and said valve.

9. An adjustable mercury and glass thermostatic regulator, including a bulb for mercury, a capillary connected with said bulb and forming a path for mercury therein, an auxiliary reservoir, a connection between said auxiliary reservoir and said capillary, a valve seat intermediate said last named connection and said auxiliary reservoir, a bellows device closing said reservoir, and a valve carried by said bellows device and longitudinally adjustable within said auxiliary reservoir toward and away from said valve seat.

10. An adjustable mercury and glass thermostatic regulator, including a bulb, a capillary connected with said bulb and forming a path for mercury therein, an auxiliary reservoir, a connection between said auxiliary reservoir and said capillary, a bellows device sealing the extremity of said capillary, a separate bellows device sealing the extremity of said auxiliary reservoir, each of said bellows devices enclosing a non-oxidizing atmosphere, an electrical contact carried by the bellows device which closes the extremity of said capillary and adjustable to selected positions within said capillary, a valve carried by the bellows device which closes the extremity of said auxiliary reservoir for controlling the connection between said auxiliary reservoir and said capillary, and independent means for controlling the position of each of said bellows devices.

11. An adjustable mercury and glass thermostatic regulator, including a bulb, a capillary connected with said bulb and forming a path for mercury therein, an auxiliary reservoir, a connection between said auxiliary reservoir and said capillary, a bellows device sealing the extremity of said capillary, a separate bellows device sealing the extremity of said auxiliary reservoir, each of said bellows devices enclosing a non-oxidizing atmosphere, an electrical contact carried by the bellows device which closes the extremity of said capillary and adjustable to selected positions within said capillary, a valve carried by the bellows device which closes the extremity of said auxiliary reservoir for controlling the connection between said auxiliary reservoir and said capillary, independent means for controlling the position of each of said bellows devices, and means for equalizing the pressure within each of said bellows devices.

12. An adjustable mercury and glass thermostatic regulator, including a bulb, a capillary connected with said bulb and forming a path for mercury therein, an auxiliary reservoir, a connection between said auxiliary reservoir and said capillary, a bellows device sealing the extremity of said capillary, a separate bellows device sealing the extremity of said auxiliary reservoir, each of said bellows devices enclosing a non-oxidizing atmosphere, an electrical contact carried by the bellows device which closes the extremity of said capillary and adjustable to selected positions within said capillary, a valve carried by the bellows device which closes the extremity of said auxiliary reservoir for controlling the connection between said auxiliary reservoir and said capillary, independent means for controlling the position of each of said bellows devices, and a tube interconnecting the areas beneath each of said bellows devices for insuring the same pressure both in said capillary and said auxiliary reservoir.

13. In a mercury and glass thermostat including a bulb for mercury, a capillary for mercury connected with said bulb, a carrier mounted adjacent the extremity of said capillary, a bellows device supported by said carrier and positioned for sealing the extremity of said capillary, an electrical contact carried by said bellows device, means for selectively controlling the position of said bellows device for correspondingly controlling the longitudinal adjustment of said contact in said capillary, a valve seat disposed at the upper extremity of said capillary, and a valve closure carried by said electrical contact and adapted to close said capillary when said contact member is sufficiently depressed.

14. A thermostat including a capillary, an auxiliary reservoir connected with said capillary, separate bellows devices for closing said capillary and said auxiliary reservoir, an electrical contact extending into said capillary and carried by the bellows device closing said capillary, and a valve disposed in the connection of said auxiliary reservoir with said capillary and carried by the bellows device closing said auxiliary reservoir.

15. A thermostat including a capillary, a bellows device for sealing said capillary, a valve seat at the opening of said capillary under said bellows device, an electrical contact member carried by said bellows and extending into said capillary, a valve closure carried by said contact and adapted to coact with said valve seat, and means for compressing said bellows for seating said valve.

16. A mercury and glass thermostat as described in claim 1 and including a valve seat disposed at the upper extremity of said capillary under the bellows device connected therewith, and a valve closure carried by said electrical contact and adapted to close said capillary.

WILLIAM H. REYNOLDS.